(12) United States Patent
Chung et al.

(10) Patent No.: US 8,827,054 B2
(45) Date of Patent: Sep. 9, 2014

(54) BRAKE CALIPER MOUNTING ASSEMBLY

(75) Inventors: I-Chao Chung, Troy, MI (US); Tomaz Dopico Varela, Shelby Township, MI (US); Kou Yang, Warren, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 117 days.

(21) Appl. No.: 13/565,901

(22) Filed: Aug. 3, 2012

(65) Prior Publication Data

US 2014/0034431 A1 Feb. 6, 2014

(51) Int. Cl.
*B62D 7/18* (2006.01)
(52) U.S. Cl.
USPC .................................. 188/73.39; 280/93.512
(58) Field of Classification Search
CPC ............................ B62D 7/18; F16D 2055/007
USPC ........................ 188/73.39, 73.46, 73.47, 206; 280/93.512; 301/6.8, 35.61, 35.621
See application file for complete search history.

(56) References Cited

U.S. PATENT DOCUMENTS

| 4,722,540 | A | * | 2/1988 | Kozyra et al. | 280/124.136 |
|---|---|---|---|---|---|
| 5,343,986 | A | | 9/1994 | Rogers et al. | |
| 5,366,233 | A | * | 11/1994 | Kozyra et al. | 280/93.512 |
| 6,098,760 | A | * | 8/2000 | Seils | 188/1.11 E |
| 6,616,156 | B1 | * | 9/2003 | Dudding et al. | 280/93.512 |
| 7,850,179 | B2 | * | 12/2010 | Ursu | 280/93.512 |
| 2005/0242540 | A1 | * | 11/2005 | Gottschalk | 280/93.512 |
| 2007/0063472 | A1 | * | 3/2007 | Hsieh | 280/93.512 |

* cited by examiner

*Primary Examiner* — Bradley King
*Assistant Examiner* — Stephen Bowes
(74) *Attorney, Agent, or Firm* — Brooks Kushman P.C.

(57) ABSTRACT

A brake caliper mounting assembly that includes a steering knuckle, a brake caliper, and first and second mounting blocks. The first and second mounting blocks are mounted to the steering knuckle. The brake caliper is mounted on the first and second blocks.

20 Claims, 2 Drawing Sheets

BRAKE CALIPER MOUNTING ASSEMBLY

TECHNICAL FIELD

The present application relates to a brake caliper mounting assembly and a method of assembly.

BACKGROUND

A caliper assembly is disclosed in U.S. Pat. No. 5,343,986.

SUMMARY

In at least one embodiment, a brake caliper mounting assembly is provided. The brake caliper mounting assembly may include a steering knuckle, a first block, a second block, and a brake caliper. The first block may be mounted to the steering knuckle. The second block may be mounted to the steering knuckle and may be spaced apart from the first block. The brake caliper may be spaced apart from the steering knuckle and may be coupled to the first and second blocks.

In at least one embodiment, a brake caliper mounting assembly is provided. The brake caliper mounting assembly may include a steering knuckle, a first block, a second block, and a brake caliper. The steering knuckle may have a first set of block mounting holes and a second set of block mounting holes. The first block may be mounted to the steering knuckle with a first set of fasteners. Each member of the first set of fasteners may be received in a member of the first set of block mounting holes. The second block may be mounted to the steering knuckle with a second set of fasteners. Each member of the second set of fasteners may be received in a member of the second set of block mounting holes. The brake caliper may be spaced apart from the steering knuckle and may be coupled to the first and second blocks.

In at least one embodiment, a method of assembling a brake caliper mounting assembly is provided. The steering knuckle may be provided that has first and second sets of block mounting holes. A first group of block mounting holes may be selected from the first set. A second group of block mounting holes may be selected from the second set. A first block may be fastened to the steering knuckle with a first set of fasteners that may engage the first group. A second block may be fastened to the steering knuckle with a second set of fasteners that may engage the second group. A brake caliper may be fastened to the first and second blocks.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
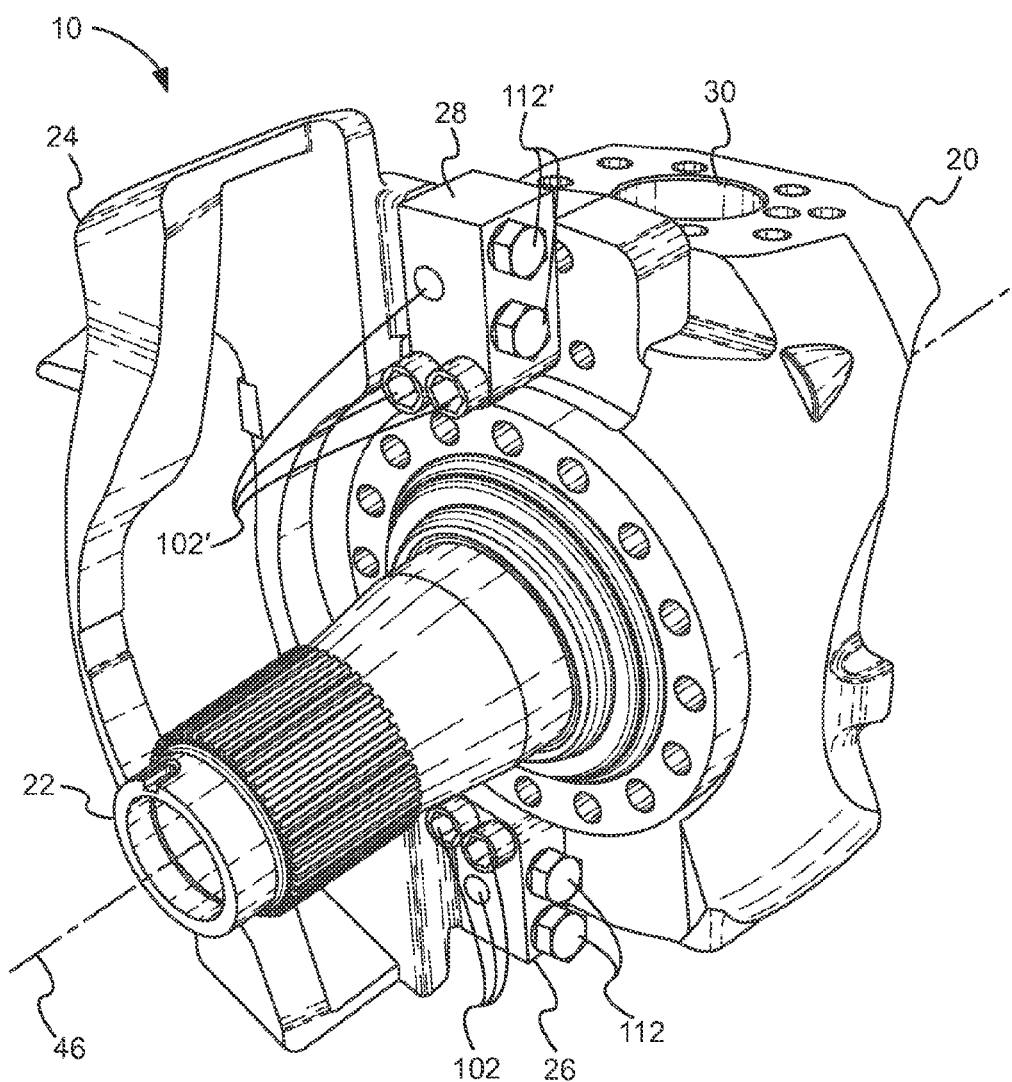
FIG. 1 is a perspective view of a brake caliper mounting assembly.
Figure 2:
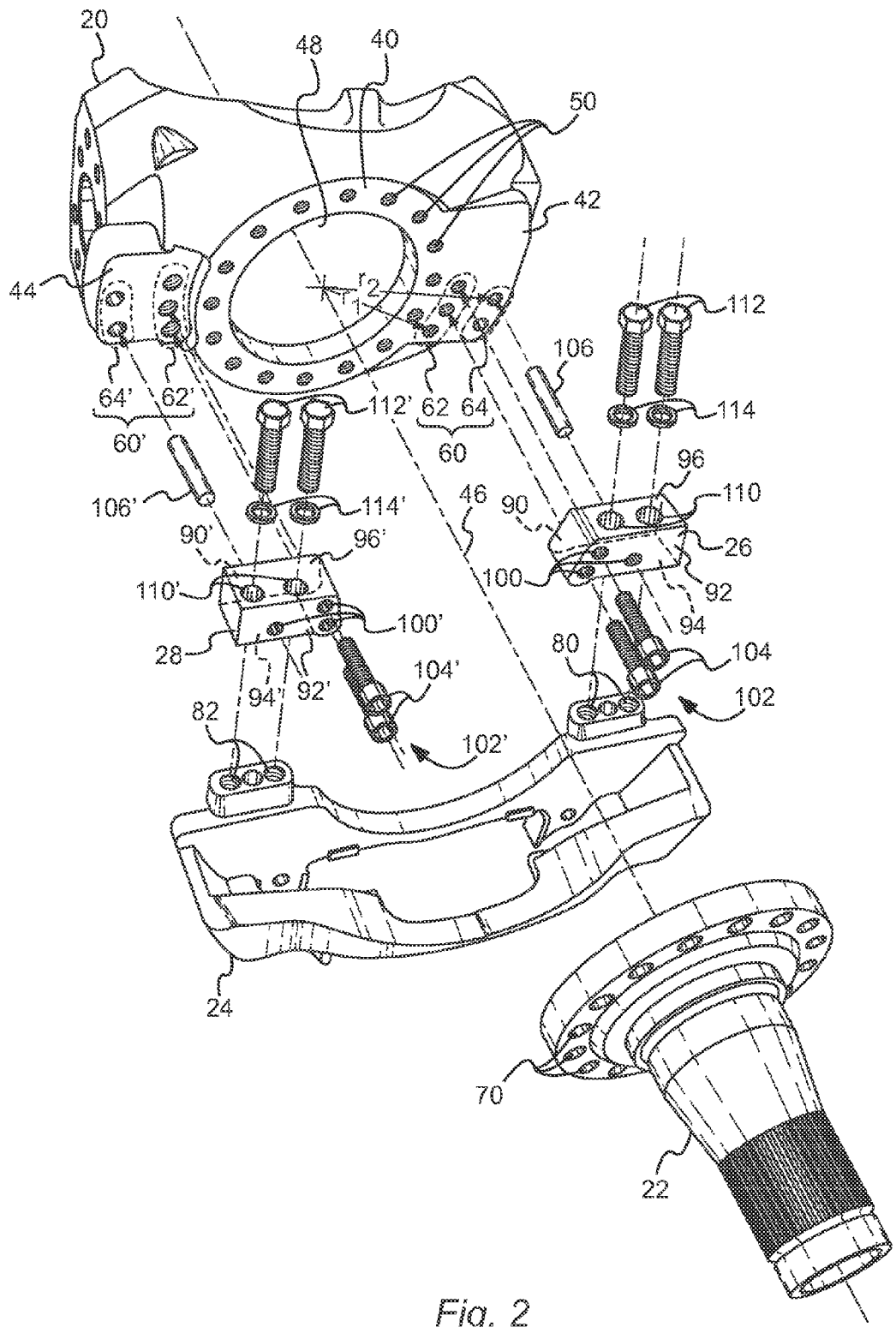
FIG. 2 is an exploded view of the brake caliper mounting assembly shown in FIG. 1.

Referring to FIGS. 1 and 2, an exemplary brake caliper mounting assembly 10 is shown. The brake caliper mounting assembly 10 may be provided as part of a vehicle, such as a motor vehicle like a truck, bus, farm equipment, military transport or weaponry vehicle, or cargo loading equipment for land, air, or marine vessels. In at least one embodiment, the brake caliper mounting assembly 10 may include a steering knuckle 20, a spindle 22, a brake caliper 24, a first block 26, and a second block 28.

The steering knuckle 20 may be coupled to an axle beam and may be part of a steering system that may be used to steer or change the direction of the vehicle. For example, the steering knuckle 20 may include at least one kingpin hole 30 that may receive a kingpin that may couple the steering knuckle 20 to the axle beam such that the steering knuckle 20 may pivot about the kingpin. The steering knuckle 20 may include a spindle mounting surface 40, a first block mounting surface 42, and a second block mounting surface 44.

The spindle mounting surface 40 may extend around an axis 46 and/or an opening 48 in the steering knuckle 20. A set of spindle mounting holes 50 may be provided in the spindle mounting surface 40. The spindle mounting holes 50 may be spaced apart from each other and may be radially disposed about the axis 46. In addition, the spindle mounting holes 50 may be threaded.

The first block mounting surface 42 may be disposed adjacent to the spindle mounting surface 40. In FIG. 2, the first block mounting surface 42 is coplanar with the spindle mounting surface 40, although it may be offset from the spindle mounting surface 40 in one or more embodiments.

A first set of block mounting holes 60 may be provided in the first block mounting surface 42. Members of the first set of block mounting holes 60 may be spaced apart from each other and may extend generally parallel to the axis 46. The first set of block mounting holes 60 may include a first subset of holes 62 and a second subset of holes 64. The first subset of holes 62 may be disposed closer to the axis 46 and/or spindle mounting holes 50 than the second subset of holes 64. For example, the first subset of holes 62 may be disposed at a first radial distance ($r_1$) from the axis 46 while second subset of holes 64 may be disposed at a second radial distance ($r_2$) from the axis 46 that is greater than the first radial distance ($r_1$). Members of the first subset of holes 62 may be threaded. Members of the second subset of holes 64 may not be threaded.

The second block mounting surface 44 may be spaced apart from the first block mounting surface 42. The second block mounting surface 44 may be offset from the spindle mounting surface 40 or may be coplanar with the spindle mounting surface 40. In at least one embodiment, the second block mounting surface 44 may be recessed from the spindle mounting surface 40, or disposed closer to the kingpin hole 30. The second block mounting surface 44 may be coplanar with or offset from the first block mounting surface 42 in one or more embodiments.

A second set of block mounting holes 60' may be provided in the second block mounting surface 44. Members of the second set of block mounting holes 60' may have a similar configuration as members of the first set of block mounting holes 60. For example, members of the second set of block mounting holes 60' may be spaced apart from each other and may extend generally parallel to the axis 46. The second set of block mounting holes 60' may also include a first subset of holes 62' and a second subset of holes 64' that are arranged like the first and second subsets of holes 62, 64 as described above.

The spindle 22 may support a wheel hub assembly that facilitates mounting and rotation of a vehicle wheel. More specifically, the spindle 22 may support one or more wheel bearings that support and facilitate rotation of a vehicle wheel. The spindle 22 may extend along the axis 46, which may also be called a spindle axis 46, and away from kingpin hole 30. The spindle 22 may be provided as a separate component that may be fastened to the steering knuckle 20 in one or more embodiments. For example, the spindle 22 may include a flange portion that includes a set of spindle holes 70. Each spindle hole 70 may be aligned with a spindle mounting hole 50. A fastener may extend through each spindle hole 70 and into a corresponding spindle mounting hole 50 to couple the spindle 22 to the steering knuckle 20. Alternatively, the spindle 22 may be press fit inside the opening 48 or may be integrally formed with the steering knuckle 20 as a unitary one-piece component in various embodiments.

The brake caliper 24 may receive and position a plurality of brake pads with respect to a rotor to facilitate braking of the vehicle. The brake caliper 24 may be spaced apart from the steering knuckle 20 and spindle 22. The brake caliper 24 may include a first set of holes 80 and a second set of holes 82. The first and second sets of holes 80, 82 may facilitate coupling of the first and second blocks 26, 28, respectively, to the brake caliper 24. In at least one embodiment, members of the first and second sets of holes 80, 82 may be threaded.

The first block 26 may facilitate coupling of the brake caliper 24 to the steering knuckle 20. The first block 26 may include a first surface 90, a second surface 92, a third surface 94, and a fourth surface 96. The first surface 90 may engage part of the steering knuckle 20, such as the first block mounting surface 42. The second surface 92 may be disposed opposite the first surface 90. The third surface 94 may be perpendicular to the first surface 90 and may engage the brake caliper 24. The fourth surface 96 may be disposed opposite the third surface 94. In addition, the third and fourth surfaces 94, 96 may extend from the first surface 90 to the second surface 92.

A set of steering knuckle mounting holes 100 may be provided with the first block 26. The set of steering knuckle mounting holes 100 may extend from the first surface 90 to the second surface 92. The steering knuckle mounting holes 100 may extend substantially parallel to the axis 46 in one or more embodiments. Each member of the set of steering knuckle mounting holes 100 may be aligned with a corresponding member of the first set of block mounting holes 60 on the steering knuckle 20. In addition, the steering knuckle mounting holes 100 may receive fasteners that couple the first block 26 to the steering knuckle 20. More specifically, a first set of fasteners 102 may be provided that extend through the steering knuckle mounting holes 100 and into a corresponding block mounting hole 60. Members of the first set of fasteners 102 may include both threaded fasteners 104, such as bolts, and unthreaded fasteners 106, such as dowel pins. A threaded fastener 104 may be provided with steering knuckle mounting holes 100 that are aligned with members of the first subset of holes 62. An unthreaded fastener 106 may be provided with steering knuckle mounting holes 100 that are aligned with members of the second subset of holes 64.

A set of brake caliper mounting holes 110 may extend from the third surface 94 to the fourth surface 96. The brake caliper mounting holes 110 may extend substantially perpendicular to the axis 46 and/or steering knuckle mounting holes 100 in one or more embodiments. At least one steering knuckle mounting hole 100 may be disposed between members of the set of brake caliper mounting holes 110. Each brake caliper mounting hole 110 may be aligned with a corresponding hole 80 on the brake caliper 24. Each brake caliper mounting hole 110 may receive a fastener that couples the first block 26 to the brake caliper 24. More specifically, a second set of fasteners 112 may be provided that extend through the brake caliper mounting holes 110 and into a corresponding hole 80 on the brake caliper 24. Members of the second set of fasteners 112 may be threaded fasteners, such as a bolt. In addition, a washer 114 may be provided between each fastener 112 and the fourth surface 96 in one or more embodiments.

The second block 28 may have a similar or identical configuration as the first block 26. In the embodiment shown, the second block 28 is thicker than the first block 26 in a direction extending along the axis 46 and is generally configured as a mirror image of the first block 26. The second block 28 may have similar surfaces and holes as the first block 26. As such, similar reference numbers used to identify features of the second block 28. For example, the second block 28 may include a first surface 90', a second surface 92', a third surface 94', and a fourth surface 96'. The first surface 90' may engage part of the steering knuckle 20, such as the second block mounting surface 44. The second surface 92' may be disposed opposite the first surface 90'. The third surface 94' may engage the brake caliper 24 and may be disposed opposite the fourth surface 96'.

A set of steering knuckle mounting holes 100' may extend from the first surface 90' to the second surface 92' similar to the steering knuckle mounting holes 100 of the first block 26. Each steering knuckle mounting holes 100' may be aligned with a corresponding member of the second set of block mounting holes 60'. The steering knuckle mounting holes 100' may receive fasteners that couple the second block 28 to the steering knuckle 20. More specifically, a first set of fasteners 102' may be provided that extend through the steering knuckle mounting holes 100' and into a corresponding block mounting hole 60'. Members of the first set of fasteners 102' may include both threaded fasteners 104', such as bolts, and unthreaded fasteners 106', such as dowel pins. A threaded fastener 104' may be provided with steering knuckle mounting holes 100' that are aligned with members of the first subset of holes 62' while an unthreaded fastener 106' may be provided with steering knuckle mounting holes 100' that are aligned with members of the second subset of holes 64'.

A set of brake caliper mounting holes 110' may extend from the third surface 94' to the fourth surface 96' like the brake caliper mounting holes 110 on the first block 26. Each brake caliper mounting hole 110' may be aligned with a corresponding hole 82 on the brake caliper 24. Each brake caliper mounting hole 110' may receive a fastener that couples the second block 28 to the brake caliper 24. More specifically, a second set of fasteners 112' may be provided that extend through the brake caliper mounting holes 110' and into a corresponding hole 82. Members of the second set of fasteners 112' may be threaded fasteners, such as a bolt. In addition, a washer 114' may be provided between each fastener 112' and the fourth surface 96' in one or more embodiments.

More block mounting holes 60, 60' may be provided than steering knuckle mounting holes 100, 100'. As such, only a portion of the first and second sets of block mounting holes 60, 60' may be utilized to mount the first and second blocks 26, 28 to the steering knuckle 20, respectively. The additional block mounting holes 60, 60' allow the first and second blocks 26, 28 to be mounted on the steering knuckle 20 in multiple positions. More specifically, the first and second blocks 26, 28 may be disposed in different angular positions with respect to the axis 46 depending on which block mounting holes 60, 60' receive fasteners 102, 102', 106, 106' that extend from the first and second blocks 26, 28, respectively. As such, the brake caliper 24 may be "clocked" or fastened to the steering knuckle 20 in different angular positions with respect to the axis 46. For example, the first block 26 may be aligned with the rightmost members of the first set of block mounting holes 60 and the second block 28 may be aligned with the leftmost members of the second set of block mounting holes 60' as shown in FIG. 2. Alternatively, the first and second blocks 26, 28 may be rotated clockwise about the axis 46 and aligned with and fastened into the adjacent block mounting hole 60, 60' to the right. Additional block mounting holes 60, 60' may be provided beyond what is shown in FIG. 2 to provide additional mounting locations for the first and second blocks 26, 28, thereby yielding additional angular positions at which the brake caliper 24 may be disposed. The brake caliper 24 may be fastened to the first and second blocks 26, 28 after the first and second blocks 26, 28 are fastened to the steering knuckle 20.

In addition to providing different brake caliper mounting positions, the brake caliper mounting assembly 10 may help reduce the weight of a wheel end assembly as compared to designs without a mounting block, such as designs that use a torque plate to fasten a brake caliper to a steering knuckle. Furthermore, a more compact wheel end package may be provided in that the distance along the axis 46 between the brake caliper 24 and steering knuckle 20 may be reduced as compared to a design in which the brake caliper 24 is mounted via a torque plate that is fastened to a steering knuckle through the spindle mounting holes 50.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake caliper mounting assembly comprising:
   a steering knuckle;
   a brake caliper that is spaced apart from the steering knuckle;
   a first block that is mounted to the steering knuckle and includes:
      a first surface that engages the steering knuckle,
      a second surface disposed opposite the first surface,
      a third surface that engages the brake caliper,
      a fourth surface that is disposed opposite the third surface, wherein the third and fourth surfaces extend from the first surface to the second surface,
      a set of brake caliper mounting holes, wherein each member of the set of brake caliper mounting holes receives a fastener that couples the first block to the brake caliper and extends from the third surface to the fourth surface, and
      a set of steering knuckle mounting holes, wherein each member of the set of steering knuckle mounting holes receives a second fastener that couples the first block to the steering knuckle and extends from the first surface to the second surface;
   a second block that is mounted to the steering knuckle and spaced apart from the first block;
   wherein the brake caliper is coupled to the first block and the second block.

2. The brake caliper mounting assembly of claim 1 wherein the first and second blocks are mountable to the steering knuckle in multiple positions to position the brake caliper in different angular positions with respect to a spindle axis.

3. The brake caliper mounting assembly of claim 1 further comprising a spindle that is disposed proximate the steering knuckle and that extends along the spindle axis.

4. The brake caliper mounting assembly of claim 1 wherein the members of the set of brake caliper mounting holes are offset from and extend substantially perpendicular to the members of the set of steering knuckle mounting holes.

5. The brake caliper mounting assembly of claim 1 wherein the first and second blocks have different configurations.

6. A brake caliper mounting assembly comprising:
   a steering knuckle;
   a first block that is mounted to the steering knuckle;
   a second block that is mounted to the steering knuckle and spaced apart from the first block; and
   a brake caliper that is spaced apart from the steering knuckle and coupled to the first block and the second block;
   wherein the first block includes a set of brake caliper mounting holes, wherein each member of the set of brake caliper mounting holes receives a fastener that couples the first block to the brake caliper, and a set of steering knuckle mounting holes, wherein each member of the set of steering knuckle mounting holes receives a second fastener that couples the first block to the steering knuckle, wherein at least one member of the set of steering knuckle mounting holes is disposed between members of the set of brake caliper mounting holes.

7. The brake caliper mounting assembly of claim 6 wherein the first and second blocks are mountable to the steering knuckle in multiple positions to position the brake caliper in different angular positions with respect to a spindle axis.

8. The brake caliper mounting assembly of claim 7 further comprising a spindle that is disposed proximate the steering knuckle and that extends along the spindle axis.

9. A brake caliper mounting assembly comprising:
   a steering knuckle having a first set of block mounting holes, a second set of block mounting holes, a set of spindle mounting holes, and a spindle mounting surface that extends around a spindle axis;
   a first block that is mounted to the steering knuckle with a first set of fasteners, wherein each member of the first set of fasteners is received in a member of the first set of block mounting holes;
   a second block that is mounted to the steering knuckle with a second set of fasteners, wherein each member of the second set of fasteners is received in a member of the second set of block mounting holes; and
   a brake caliper that is spaced apart from the steering knuckle and coupled to the first block and the second block;
   wherein the first set of block mounting holes and the set of spindle mounting holes are disposed on the spindle mounting surface and the spindle mounting holes are radially disposed about the spindle axis such that the set of spindle mounting holes are disposed closer to the spindle axis than the first and second sets of block mounting holes.

10. The brake caliper mounting assembly of claim 9 wherein the first and second blocks are mountable to the steering knuckle in multiple positions to position the brake caliper in different angular positions with respect to a spindle axis.

11. The brake caliper mounting assembly of claim 9 further comprising a spindle that is disposed proximate the steering knuckle and that extends along the spindle axis.

12. The brake caliper mounting assembly of claim 9 wherein the first set of block mounting holes includes a first subset of holes and a second subset of holes, wherein the first subset of holes are disposed closer to the spindle axis than the second subset of holes.

13. The brake caliper mounting assembly of claim 12 wherein the first subset of holes are disposed at a first radial distance from the spindle axis and the second subset of holes are disposed a second radial distance from the spindle axis.

14. The brake caliper mounting assembly of claim 12 wherein one member of the second subset of holes receives a dowel pin that extends from the first block and first and second members of the first subset of holes receive a threaded fastener that extends from the first block.

15. A brake caliper mounting assembly comprising:
a steering knuckle having a first set of block mounting holes and a second set of block mounting holes;
a first block that is mounted to the steering knuckle with a first set of fasteners, wherein each member of the first set of fasteners is received in a member of the first set of block mounting holes;
a second block that is mounted to the steering knuckle with a second set of fasteners, wherein each member of the second set of fasteners is received in a member of the second set of block mounting holes; and
a brake caliper that is spaced apart from the steering knuckle and coupled to the first block and the second block;
wherein the first and second sets of fasteners each include a plurality of threaded fasteners and a dowel pin.

16. A brake caliper mounting assembly comprising:
a steering knuckle having a first set of block mounting holes and a second set of block mounting holes;
a first block that is mounted to the steering knuckle with a first set of fasteners, wherein each member of the first set of fasteners is received in a member of the first set of block mounting holes;
a second block that is mounted to the steering knuckle with a second set of fasteners, wherein each member of the second set of fasteners is received in a member of the second set of block mounting holes; and
a brake caliper that is spaced apart from the steering knuckle and coupled to the first block and the second block;
wherein the first set of block mounting holes includes a first subset of holes and a second subset of holes, wherein the first subset of holes are disposed closer to a spindle axis than the second subset of holes and wherein members of the first subset of holes are threaded and the second subset of holes are not threaded.

17. A brake caliper mounting assembly comprising:
a steering knuckle having a first set of block mounting holes, a second set of block mounting holes, a second block mounting surface, and a spindle mounting surface that extends around a spindle axis;
a first block that is mounted to the steering knuckle with a first set of fasteners, wherein each member of the first set of fasteners is received in a member of the first set of block mounting holes;
a second block that is mounted to the steering knuckle with a second set of fasteners, wherein each member of the second set of fasteners is received in a member of the second set of block mounting holes; and
a brake caliper that is spaced apart from the steering knuckle and coupled to the first block and the second block;
wherein the first set of block mounting holes are disposed on the spindle mounting surface, the second set of block mounting holes are disposed on the second block mounting surface, and the second block mounting surface is offset from the spindle mounting surface.

18. A method of assembling brake caliper mounting assembly, comprising:
providing a steering knuckle having a first set of block mounting holes and a second set of block mounting holes;
selecting a first group of block mounting holes from the first set;
fastening a first block to the steering knuckle with a first set of fasteners, wherein each member of the first set of fasteners engages a member of the first group;
selecting a second group of block mounting holes from the second set;
fastening a second block to the steering knuckle with a second set of fasteners, wherein each member of the second set of fasteners engages a member of the second group;
fastening a brake caliper to the first and second blocks;
wherein the first block includes:
a set of steering knuckle mounting holes, wherein each member of the set of steering knuckle mounting holes receives a member of the first set of fasteners; and
a set of brake caliper mounting holes that facilitate fastening of the brake caliper to the first block, wherein the members of the set of brake caliper mounting holes are offset from and extend substantially perpendicular to the members of the set of steering knuckle mounting holes.

19. The method of claim 18 wherein the first and second blocks are mountable to the steering knuckle in multiple positions to position the brake caliper in different angular positions with respect to a spindle axis.

20. The method of claim 18 wherein first and second groups of block mounting holes include a portion of the first and second sets of block mounting holes, respectively.

* * * * *